R. ENDER.
TAILORS' MEASURE.
No. 177,702. Patented May 23, 1876.
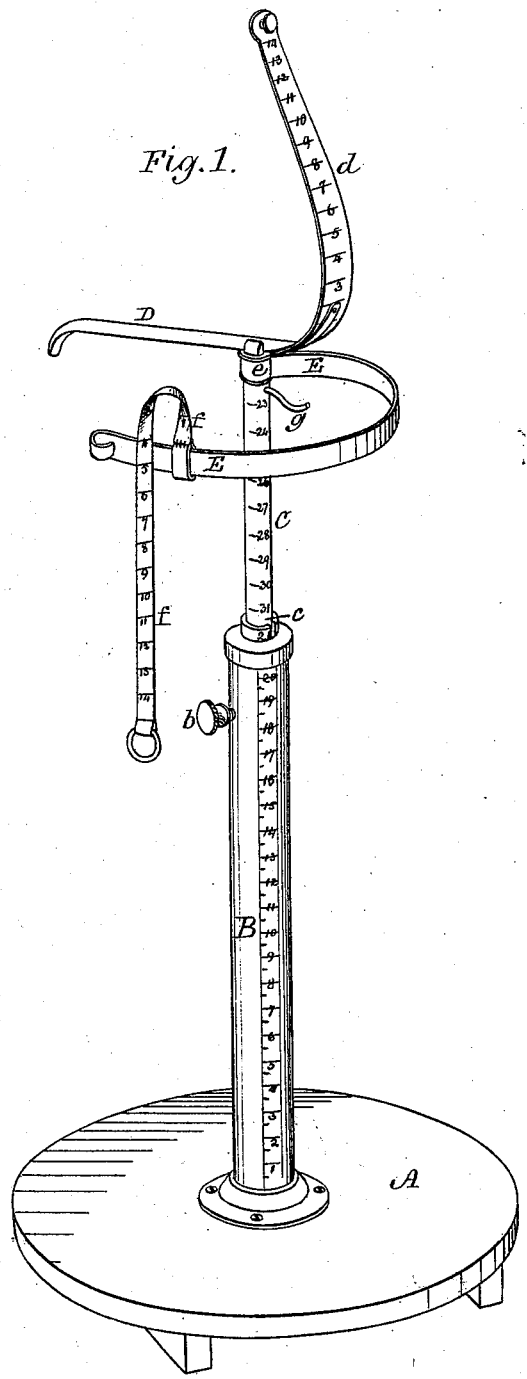
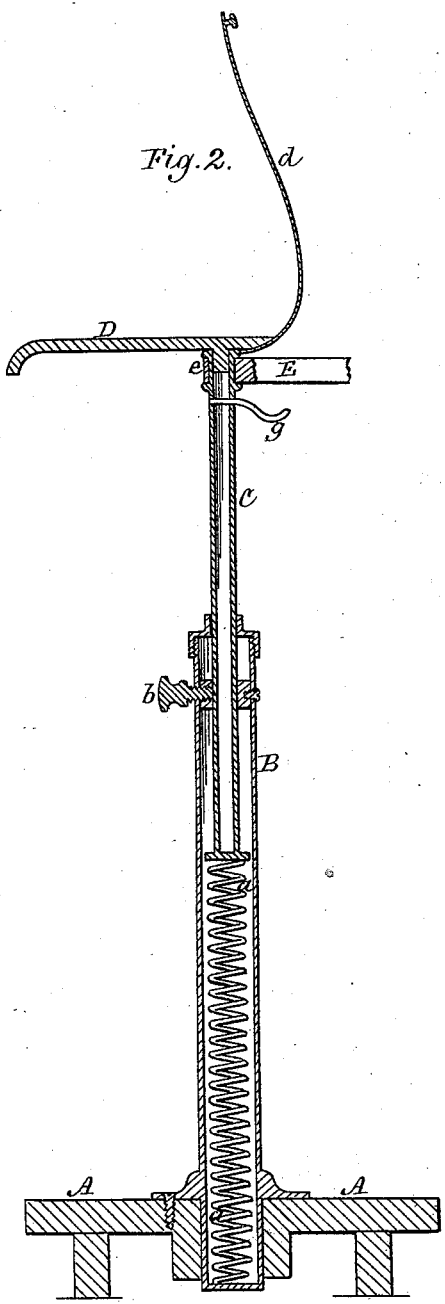
Witnesses.
D. R. Cowl
Edmund Masson
Inventor:
Richard Ender,
By Atty. A. B. Stoughton.

UNITED STATES PATENT OFFICE.

RICHARD ENDER, OF BALTIMORE, MARYLAND.

IMPROVEMENT IN TAILORS' MEASURES.

Specification forming part of Letters Patent No. 177,702, dated May 23, 1876; application filed February 6, 1875.

*To all whom it may concern:*

Be it known that I, RICHARD ENDER, of Baltimore, in the county of Baltimore and State of Maryland, have invented certain new and useful Improvements in Tailors' Measuring-Instruments; and that the following is a full, clear, and exact description of the same, reference being had to the accompanying drawings, making a part of this specification, in which—

Figure 1 represents the measuring-instrument in perspective and ready for use; Fig. 2 represents a vertical section through the same.

This invention relates to a tailor's measuring-instrument mounted upon a base or stand, and furnished with rigid and flexible measuring devices, so that the person to be measured may stand erect on said stand, and the measuring devices be readily and conveniently applied to his person, and as readily read or called off by the user.

To enable others skilled in the art to make and use my invention, I will now proceed to describe the same with reference to the drawings.

A represents a base or stand, which, for convenience in being moved, may be furnished with casters, and to be immovable when in use may have the casters set upon springs so that they will be locked under the weight of a person on said stand, in the usual well-known way. Upon this base or stand is mounted a hollow column, B, which has a scale of inches and fractions thereof upon it, the scale being read from the figure 1 near the bottom toward the top of the column. In this hollow column there is spiral spring, $a$, upon which is set a second and smaller column, C, (hollow for the sake of lightness,) and upon this movable column C there is marked a scale of inches and fractions thereof, which read from the top toward the bottom thereof, so that at the point $c$ the sum of the height of both of the columns can be seen and read off. $b$ is a clamping-screw, by which the two columns may be rigidly held together when necessary. On top of the movable column C there is a horizontal arm, D, rigidly affixed, and having its outer end bent or curved slightly downward. Near the top of the column C there is attached a flexible metallic scale-piece, $d$, extending upward, with inches and fractions thereof marked on it, and which read from the bottom toward the top, and underneath, or in close proximity to this scale $d$, there is attached to said column C by a sleeve or boss, $e$, so that it can swing or turn thereon, a horizontal flexible metallic arm, E, upon which there is a sliding tape-measure, $f$, marked in inches and fractions thereof. And on the column C there is a thumb-piece, $g$, by which the column C may be pressed down into the hollow column B against the action of the spring, and where it can be held by the clamp-screw $b$, and when released it will rise up by the reaction of the spring $a$.

The instrument is used as follows: The person to be measured steps upon the stand A. The arm D is passed between the legs of the person, and the clamp-screw being released, the arm and column C will rise until the arm D comes against the crotch of the person being measured, and where it is clamped by the set-screw $b$. Then at $c$ can be seen and read the length of the leg, a slight allowance at the bottom of the column B being made for the height of an ordinary heel on a boot or shoe. The flexible measure $d$ may next be laid against the body of the person to measure the height of the waistband above the crotch, and finally the arm E is swung around at or near the hip, and the measurer $f$ is used to ascertain the height of the waistband above the hip. Thus the principal measures are easily and speedily ascertained—the minor ones may be had in the usual well-known way.

Having thus fully described my invention, what I claim is—

In combination with fixed and movable columns B C, and their scales, the arm D, and measurers $d$ E $f$, as and for the purpose described and represented.

RICHARD ENDER.

Witnesses:
GEORGE E. SAVILLE,
JAMES C. G. UNDRICH.